(12) United States Patent
Popa

(10) Patent No.: US 10,347,385 B2
(45) Date of Patent: Jul. 9, 2019

(54) DISCHARGE APPARATUS USABLE FOR DETERMINING NEUTRON FLUX

(71) Applicant: WESTINGHOUSE ELECTRIC COMPANY, LLC., Cranberry Township, PA (US)

(72) Inventor: Frank David Popa, Murrysville, PA (US)

(73) Assignee: Westinghouse Electric Company, LLC, Cranberry Township, PA (US)

( * ) Notice: Subject to any disclaimer, the term of this patent is extended or adjusted under 35 U.S.C. 154(b) by 890 days.

(21) Appl. No.: 14/840,331

(22) Filed: Aug. 31, 2015

(65) Prior Publication Data

US 2017/0062083 A1  Mar. 2, 2017

(51) Int. Cl.
G21C 17/108 (2006.01)
(52) U.S. Cl.
CPC .................................. G21C 17/108 (2013.01)
(58) Field of Classification Search
CPC .................................................... G21C 17/108
See application file for complete search history.

(56) References Cited

U.S. PATENT DOCUMENTS

| 3,375,370 | A | * | 3/1968 | Hilborn | G01T 3/006 |
|---|---|---|---|---|---|
| | | | | | 250/370.04 |
| 5,251,242 | A | * | 10/1993 | Impink, Jr. | G21C 17/108 |
| | | | | | 376/154 |
| 6,596,998 | B1 | * | 7/2003 | Siedel | G21C 17/108 |
| | | | | | 250/254 |
| 2012/0177166 | A1 | * | 7/2012 | Seidel | G21C 17/10 |
| | | | | | 376/254 |
| 2013/0083879 | A1 | * | 4/2013 | Heibel | G21C 17/00 |
| | | | | | 376/153 |
| 2014/0050293 | A1 | * | 2/2014 | Garrett | G21C 3/16 |
| | | | | | 376/412 |
| 2014/0321591 | A1 | * | 10/2014 | Heibel | G21C 17/102 |
| | | | | | 376/245 |
| 2014/0321592 | A1 | * | 10/2014 | Popa | G01T 3/006 |
| | | | | | 376/255 |

* cited by examiner

*Primary Examiner* — Lily C Garner
(74) *Attorney, Agent, or Firm* — Joseph C. Spadscene; Westinghouse Electric Company, LLC

(57) ABSTRACT

A discharge apparatus usable in a nuclear reactor includes an emitter apparatus in the form of a plurality of wire segments that emit electrons via beta decay to a collector. The rate at which the electrons are emitted is directly related to the neutron flux in the vicinity of each wire segment. The continual emission of electrons from the wire segments to the collector results in a charge imbalance, and an electrostatic discharge event in the form of a spark occurs between the wire segment and the collector. Time-of-flight techniques are used to analyze signals that result from the electrostatic discharge event to determine the position along the discharge apparatus where the electrostatic discharge event occurred. The electrostatic discharge events over time at various locations along the discharge apparatus where the wire segments are situated are employed in determining the neutron flux and thus the power generation at the locations.

20 Claims, 4 Drawing Sheets

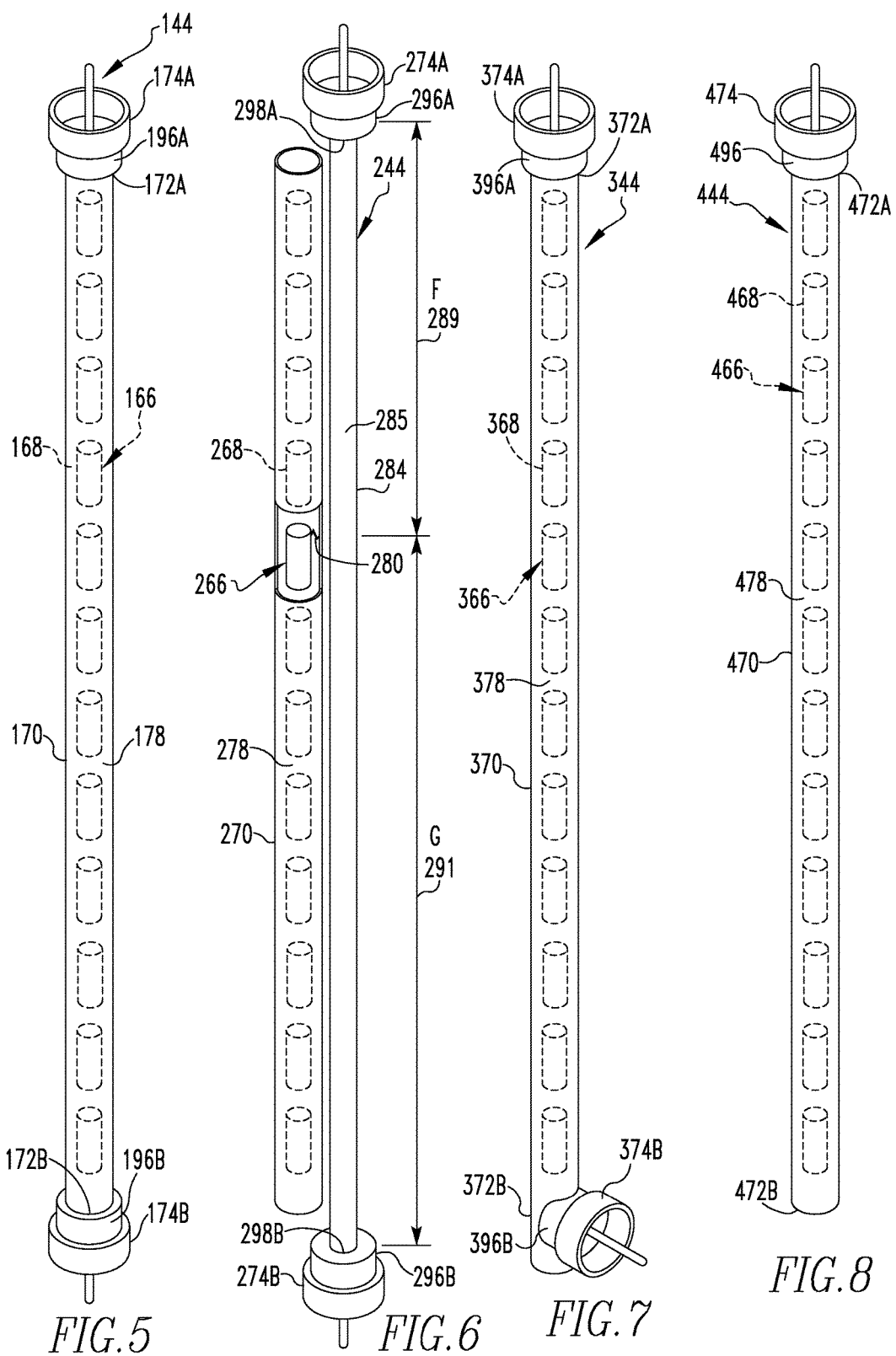

DISCHARGE APPARATUS USABLE FOR DETERMINING NEUTRON FLUX

BACKGROUND

1. Field

The disclosed and claimed concept relates generally to nuclear power generation equipment and, more particularly, to a device usable to detect neutron flux and thus power generation in a nuclear reactor.

2. Background

Nuclear power plants and other types of devices that employ controlled nuclear reactions are well known. During operation of a nuclear reactor, it is desirable to understand the rate at which power is being generated at various areas within the reactor. Devices that can sense electric power generation via neutron flux and the like are well known in the relevant art. However, inasmuch as space within a nuclear reactor for instrumentation and the like is limited, it has generally been possible to employ only a limited number of detection devices within the containment of a nuclear reactor. The result has been that the detected values of power generation at various locations within a reactor core have been capable of at most only a coarse approximation. This is due, at least in part, to the fact that known detection devices have had required telemetry wires to extend between the sensing device and an appropriate data logging device. Such wires occupy volume within the reactor core, and available volume for such wires is limited at best. It thus would be desirable to enable more accurate power generation values within the core of a nuclear reactor.

SUMMARY

An improved discharge apparatus usable in a nuclear reactor includes an emitter apparatus in the form of a plurality of wire segments that emit electrons via beta decay to a collector. The rate at which the electrons are emitted is directly related to the neutron flux in the vicinity of each wire segment. Since the wire segments and the collector are electrically insulated from one another, the continual emission of electrons from the wire segments to the collector results in a charge imbalance between each wire segment and the collector. Eventually, the charge imbalance between the collector and a wire segment overcomes the dielectric properties of the insulation that is interposed between the wire segment and the collector, and an electrostatic discharge event in the form of a spark occurs between the wire segment and the collector. A detection device employs time-of-flight techniques to analyze signals that result from the electrostatic discharge event to determine the position along the discharge apparatus where the electrostatic discharge event occurred. The various occurrences of electrostatic discharge events over the course of time and at various locations along the discharge apparatus where the wire segments are situated are employed in determining the neutron flux and thus the power generation at the locations.

Accordingly, an aspect of the disclosed and claimed concept is to provide an improved discharge apparatus that is usable to provide an indication of neutron flux and thus power generation at various locations inside a nuclear containment.

Another aspect of the disclosed and claimed concept is to provide such a discharge apparatus that is usable within a limited amount of space within a nuclear containment.

Another aspect of the disclosed and claimed concept is to perform various time-of-flight analyses of signals that are detected as a result of electrostatic discharge events to determine the positions of the electrostatic discharge events in order to measure neutron flux and thus power generation rates at various locations within a nuclear reactor containment.

Another aspect of the disclosed and claimed concept is to provide a discharge apparatus that employs a plurality of spaced apart emitters in the form of wire segments that emit electrons via beta decay in a neutron bombardment environment and wherein the emitters are electrically insulated from a collector that collects the electrons from the emitters.

Accordingly, an aspect of the disclosed and claimed concept is to provide an improved discharge apparatus usable in a nuclear reactor environment for determining neutron flux at a plurality of locations and being structured to be connected with a number of inputs of a detection device. The discharge apparatus can be generally stated as including an elongated emitter apparatus comprising a plurality of emitters spaced apart from one another in a predetermined fashion along the longitudinal extent of the emitter apparatus, the plurality of emitters each being structured to emit a number of electrons via beta decay responsive to its absorption of neutrons, a collector situated in proximity to the emitter apparatus and being structured to collect from the plurality of emitters the number of electrons, an insulator apparatus interposed between the emitter apparatus and the collector, the insulator apparatus electrically insulating from one another at least some of the emitters of the plurality of emitters, the emitter apparatus and the collector being electrically insulated from one another due at least in part to the insulator apparatus, and at least some of the emitters of the plurality of emitters each being structured to undergo an electrostatic discharge event with the collector when an imbalance in electrical charge between the emitter and the collector is sufficient to exceed the dielectric properties of the insulator apparatus.

Other aspect of the disclosed and claimed concept are provided by a method of employing the aforementioned discharge apparatus in determining neutron flux at a plurality of locations in a nuclear reactor environment. The method can be generally stated as including connecting the discharge apparatus with a number of inputs of a detection device, detecting an input signal at the number of inputs as being representative of an electrostatic discharge event, determining with the detection device a time differential between a portion of the input signal and another portion of the input signal, employing the time differential to identify a position along the longitudinal extent of the emitter apparatus as being the site where the electrostatic discharge event occurred, and determining a neutron flux at a location that includes the position and that is based at least in part upon the occurrence of the electrostatic discharge event.

BRIEF DESCRIPTION OF THE DRAWINGS

A further understanding of the disclosed and claimed concept can be gained from the following Description when read in conjunction with the accompanying drawings in which:

FIG. 5 is a schematic depiction of an improved discharge apparatus in accordance with a second embodiment of the disclosed and claimed concept that can be used in place of the discharge apparatus depicted in FIGS. 1 and 2;

FIG. 6 is a schematic depiction of an improved discharge apparatus in accordance with a third embodiment of the disclosed and claimed concept that can be used in place of the discharge apparatus depicted in FIGS. 1 and 2;

FIG. 7 is a schematic depiction of an improved discharge apparatus in accordance with a fourth embodiment of the disclosed and claimed concept that can be used in place of the discharge apparatus depicted in FIGS. 1 and 2; and FIG. 8 is a schematic depiction of an improved discharge apparatus in accordance with a fifth embodiment of the disclosed and claimed concept that can be used in place of the discharge apparatus depicted in FIGS. 1 and 2.

Similar numerals refer to similar parts throughout the specification.

DESCRIPTION OF THE PREFERRED EMBODIMENT

Figure 1:
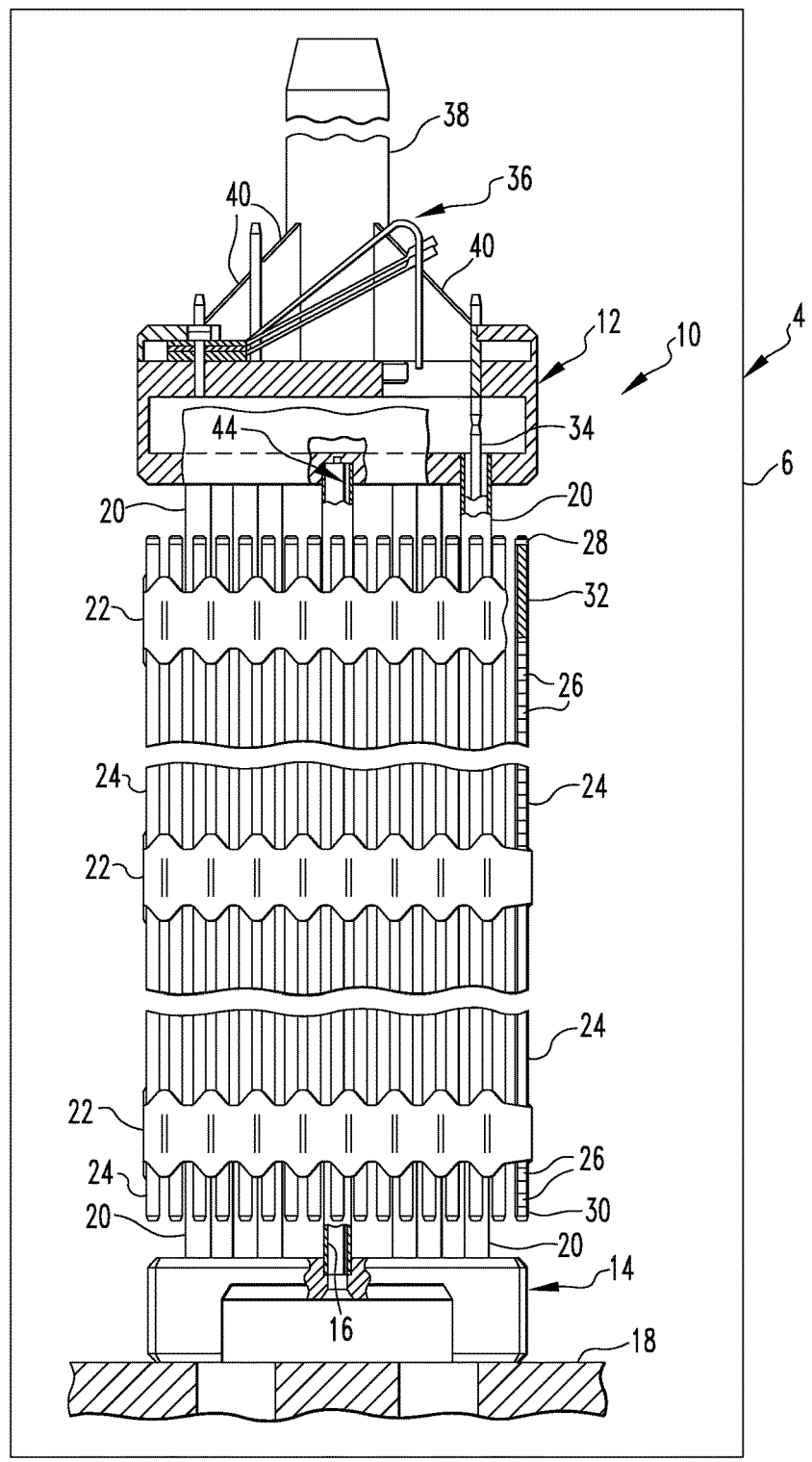
FIG. 1 is a schematic depiction of a nuclear reactor that employs an improved discharge apparatus in accordance with the disclosed and claimed concept.

FIG. 1 illustrates a typical pressurized water nuclear reactor 4 having a nuclear containment 6 that encloses a nuclear fuel assembly 10. The fuel assembly 10 has a structural skeleton which, at its lower end includes a bottom nozzle 14. The bottom nozzle 14 supports the fuel assembly 10 on a lower core support plate 18 within the containment 6. In addition to the bottom nozzle 14, the structural skeleton of the fuel assembly 10 also includes a top nozzle 12 at its upper end and a number of guide tubes or thimbles 20, which extend longitudinally between the bottom and top nozzles 14 and 12 at the opposite ends thereof and which are rigidly attached thereto.

The structural skeleton of the fuel assembly 10 further includes a plurality of grids 22 that are axially spaced along and are mounted to the guide thimble tubes 20. In the final assembly the grids 22 function to maintain an organized array of elongated fuel rods 24 spaced apart and supported by the grids 22. Also, the structural skeleton of the fuel assembly 10 includes an instrumentation tube 16 located in the center thereof, which extends and is captured between the bottom and top nozzles 14 and 12. With such an arrangement of parts, fuel assembly 20 forms an integral unit capable of being conveniently handled without damaging the assembled parts.

The fuel rods 24 are not actually part of the structural skeleton of the fuel assembly 10, but are inserted into the individual cells within the grids 22 before the top nozzle is finally affixed at the end the of fuel assembly 10. As mentioned above, the fuel rods 24, as in the array shown in the fuel assembly 10, are held in a spaced relationship with one another by the grids 22 spaced along the fuel assembly length. Each fuel rod 24 includes a stack of nuclear fuel pellets 26 and is closed at its opposite ends by upper and lower fuel rod end plugs 28 and 30. The pellets 26 are maintained in the stack by plenum spring 32 disposed between the upper end plug 28 and the top of the pellet stack. The fuel pellets 26, composed of fissile material, are responsible for creating the thermal power of the reactor 4.

A liquid moderator/coolant such as water or water containing boron, is pumped upwardly through a plurality of flow openings in the lower core support plate 18 to the fuel assembly 10. The bottom nozzle 14 of the fuel assembly 10 passes the coolant upwardly through the guide tubes 20 and along the fuel rods 24 of the assembly 10 in order to extract heat generated therein for the production of useful work. For the purpose of illustration, FIG. 1 shows a 17×17 array of fuel rods 24 in a square configuration. It should be appreciated that other arrays of different designs and geometries are employed in various models of pressurized reactors. For example an alternative fuel assembly may be formed in a hexagonal array with the basic components of the structural skeleton that are illustrated in FIG. 1.

To control the fission process, a number of control rods 34 are reciprocally movable in the guide thimbles 20 located at predetermined positions in the fuel assembly 10. A rod cluster control mechanism 36 positioned above the top nozzle 12 supports the control rod 34. The control mechanism has an internally threaded cylindrical member 38 which functions as a drive rod with a plurality of radial extending flukes or arms 40. Each arm 40 is interconnected to a control rod 34 such that the control rod mechanism 36 is operable to move the control rods vertically in the guide thimbles 20 to thereby control the fission process in the fuel assembly 10, all in a well-known manner.

The grids 22 are mechanically attached to the control rod guide thimbles 20 and the instrumentation tube 16 by welding or by bulging. Bulging is desirable where welding dissimilar materials is difficult.

Figure 2:
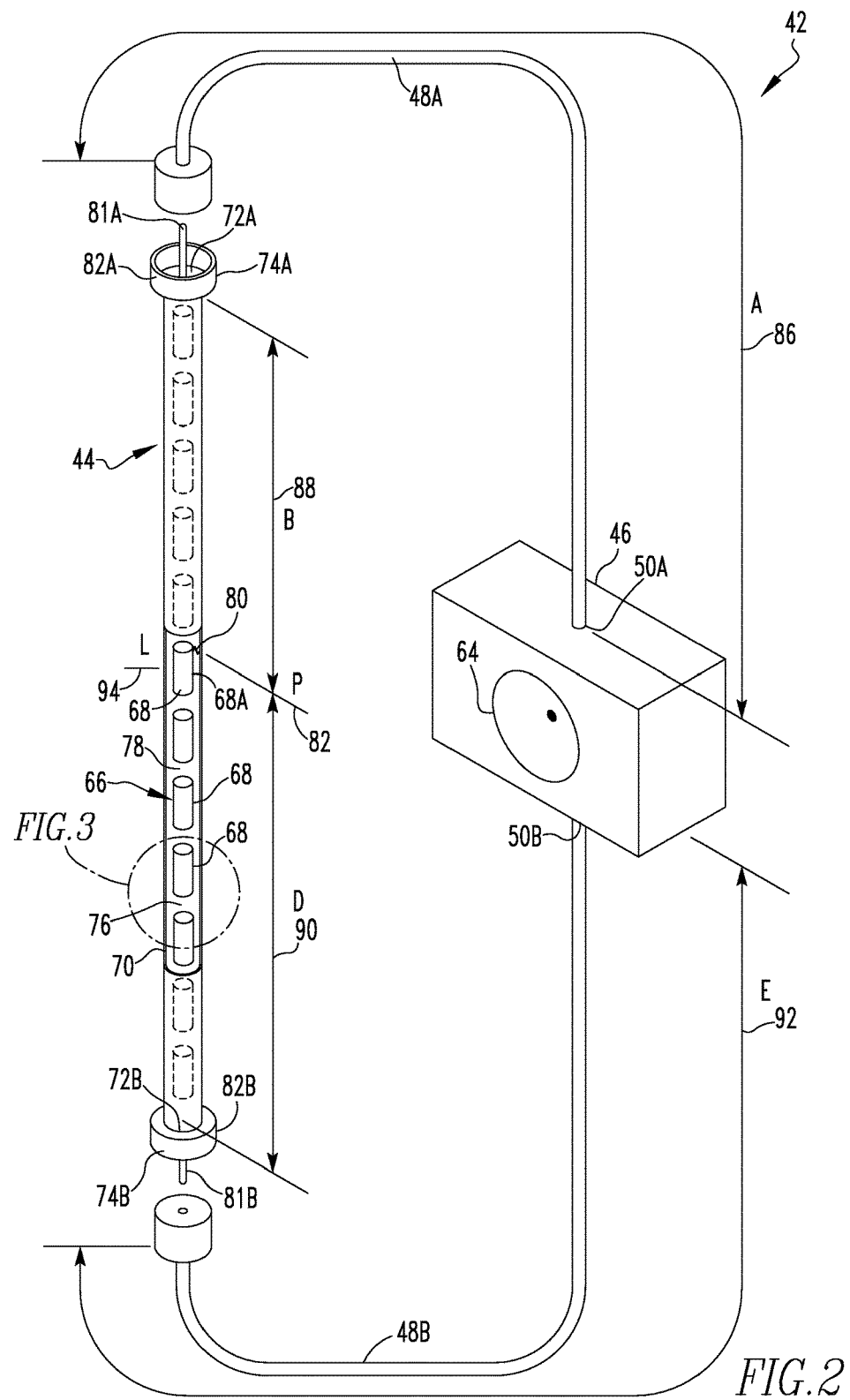
FIG. 2 is a schematic depiction of an improved detection assembly that is employed in the nuclear reactor of FIG. 1 and that includes an improved discharge apparatus in accordance with a first embodiment of the disclosed and claimed concept.
Figure 3:
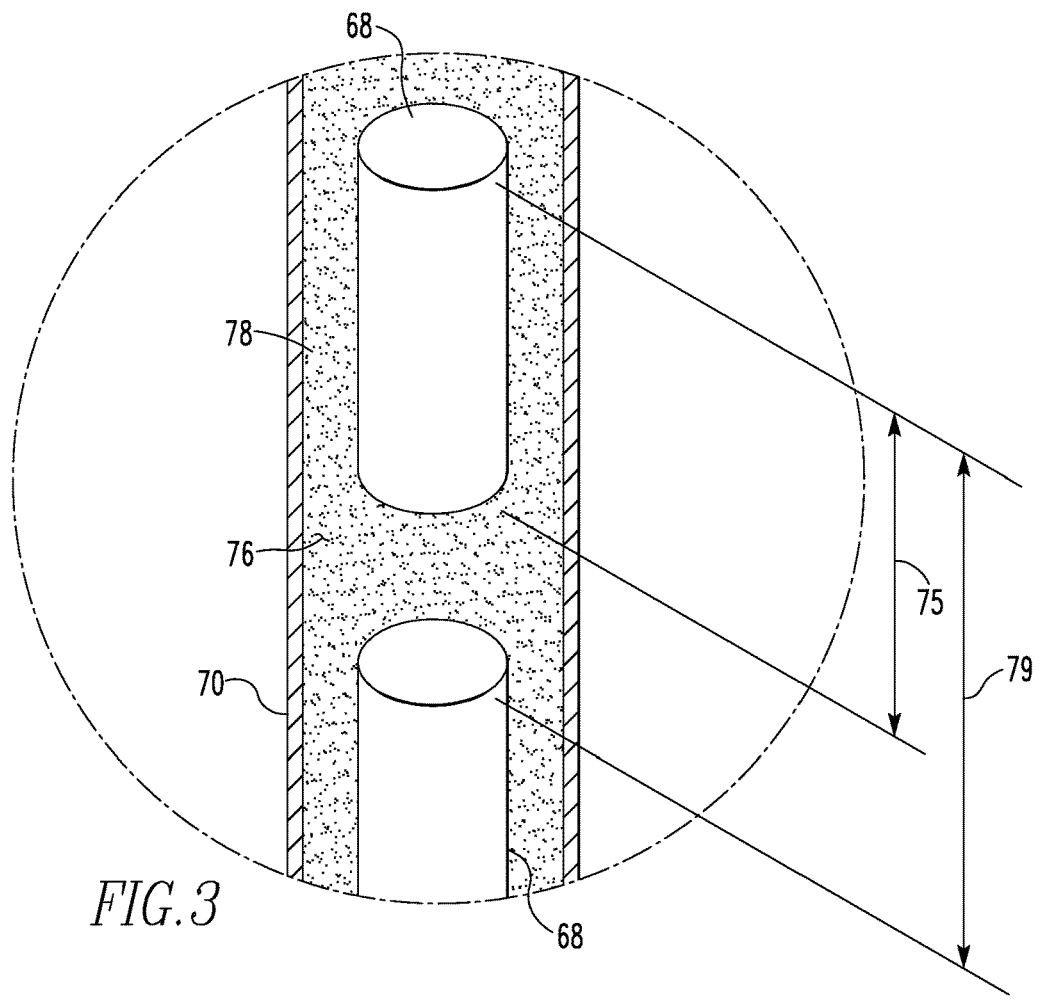
FIG. 3 is an enlargement of the indicated portion of FIG. 2.

An improved detection assembly 42 is depicted in FIG. 2 and is usable with the nuclear reactor 4 of FIG. 1. The detection assembly 42 includes a discharge apparatus 44, a detection device 46, and a set of connecting wires 48A and 48B. The connecting wires 48A and 48B are connectable with the ends of the discharge apparatus 44 and are further connectable with a pair of inputs 50A and 50B of the detection device 46. The discharge apparatus 44 is depicted in FIG. 1 as extending through the instrument thimble 16. The discharge apparatus 44 that is depicted in FIGS. 1-3 is a first embodiment thereof, and it is noted that additional embodiments of the discharge apparatus 44 are depicted in FIGS. 5-8. The alternative embodiments of the discharge embodiments 44 are connectable with the connecting wires 48A and 48B for connection with the inputs 50A and 50B of the detection device 46 to form additional embodiments of the detection assembly 42.

As will be set forth in greater detail below, the discharge apparatus 44 is advantageously employable to measure the rate at which power is produced within the nuclear reactor at various points along what can be referred to as an "axis of detection" which, in the depicted exemplary embodiment, is generally along the instrument thimble 16. While the exemplary "axis of detection" that is provided by the discharge apparatus 44 is depicted in FIG. 1 as being in the instrument thimble 16, it is noted that the discharge apparatus 44 in particular and the detection assembly 42 as a whole are usable to detect power generation rates at other locations within the nuclear reactor 4 without departing from the present concept.

Advantageously, the discharge apparatus 44 is configured to provide an apparatus that enables accurate measurements of power generation at a large number of locations along the "axis of detection" while maintaining a relatively small footprint, i.e., requiring relatively small volume within the nuclear reactor 4. This is at least in part because the discharge apparatus 44 does not rely upon a plurality of sensing elements each having separate wires that are connected with a data logging device. Rather, and in conjunction with the detection device 46, the discharge apparatus 44 relies instead upon time-of-flight analysis of electrostatic discharge events within the discharge apparatus 44 to determine the positions along the discharge apparatus 44 where the electrostatic discharge events have occurred. As will be set forth in greater detail below, such electrostatic discharge events provide an indication of power generation at numerous locations along the length of the discharge apparatus 44.

Figure 4:
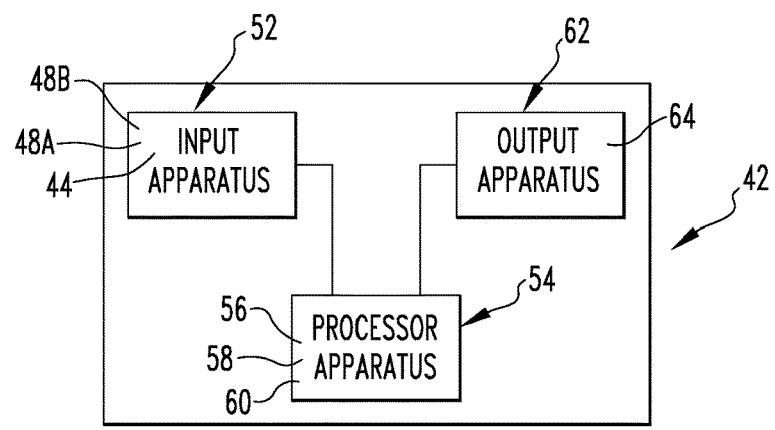
FIG. 4 is a schematic depiction of the detection assembly of FIG. 2.

As is depicted in FIG. 4, it understood that the discharge apparatus 44, the connecting wires 48A and 48B, and the inputs 50A and 50B on the detection device 46 can be referred to as together functioning as an input apparatus 52 that provides input signals to a processor apparatus 54. The detection device 46 can be said to include the processor apparatus 54, and the processor apparatus 54 includes a processor 56 and a storage 58 having a number of routines 60 stored therein. As employed herein, the expression "a number of" and variations thereof shall refer broadly to any non-zero quantity, including a quantity of one. The processor 56 can be any of a wide variety of computer processors, including microprocessors and the like that can perform operations based upon instructions that are stored in a memory or other storage. The storage 58 a non-transitory storage medium and can include any one or more of the wide variety of electronic storage devices such as RAM, ROM, EPROM, EEPROM, FLASH, and the like that enable the storage of instructions and data that is used by the processor apparatus 54. The routines 60 are stored in the storage 58 and are executable by the processor 56 and comprise any of a variety of instructions which, when executed on the processor 56, cause the processor apparatus 54 and thus the detection assembly 42 to perform certain operations that will be set forth in greater detail below.

The detection device 46 additionally includes an output apparatus 62 that receives output signals from the processor apparatus 54 and which is depicted in FIG. 2 as being a visual display 64 such as in the nature of a computer display or as a CRT of an oscilloscope. The detection device 46 can itself be or include a general purpose computer. The output apparatus 62 can additionally include connections with mainframe computer, servers, and the like, and it is noted that the output apparatus 62 can facilitate distributed processing of certain of the input signals that are provided by the input apparatus 52 to the processor apparatus 54.

The discharge apparatus 44 is depicted in a schematic fashion in FIG. 2 and includes an emitter apparatus 66 having a plurality of emitters 68. The discharge apparatus 44 further comprises a collector 70 that is in the form of an elongated tube within which the emitter apparatus 66 is situated. As will be set forth in greater detail below, the discharge apparatus 44 additionally includes an insulator apparatus 78 that is situated within an interior region 76 and which electrically insulates the emitters 68 from one another and further electrically insulates each of the emitters 68 from the collector 70

In the depicted exemplary embodiment, the emitters 68 are short sections of wire, formed of a material such as Vanadium 51 or Rhodium, and may be on the order of one to three inches in length, by way of example. The material from which the emitters 68 are formed is desirably a material that emits high energy electrons via beta decay when bombarded by neutrons, such as is described in U.S. Pat. No. 3,375,370 entitled "Self-Powered Neutron Detector", the disclosures of which are incorporated herein by reference.

As is generally understood in the relevant art, when an emitter 68 is formed of a metal such as is described herein or in the aforementioned patent and is bombarded by neutrons, it periodically emits high energy electrons via beta decay, and such high energy electrons are collected by the collector 70. The collector 70 is typically formed of a material that does not emit large numbers of electrons via beta decay when bombarded by neutrons. In the aforementioned patent, and in contrast to the disclosed and claimed concept, the emitter and the collector are electrically connected together, and the electrons that are emitted by the emitter and that are collected by the collector are then electrically returned via an electrical connection between the emitter and the collector, and the current that results from such transfer of the collected electrons from the collector back to the emitter is measured and the result is communicated to a data logging device. The wires that are required in the aforementioned patent to complete the circuit and to connect with the data logging device occupy a certain amount of space, and is thus impractical to provide a large number of such self-powered neutron detectors along an axis of a nuclear reactor because the wires eventually occupy a large amount of space.

The improved discharge apparatus 44 of the disclosed and claimed concept avoids of such numerous connection wires by electrically insulating each of the emitters 68 from the collector 70 during beta decay wherein each emitter 68 is bombarded by neutrons and periodically emits high powered electrons that are collected by the collector 70. As the emitters 68 continue to discharge electrons to the collector 70 without a return of such electrons to the emitters 68, each emitter 68 begins to develop a charge imbalance with respect to the collector 70. The charge imbalance involves the emitter 68 having a relatively positive charge and the collector 70, being grounded, having a neutral charge. Once the charge imbalance reaches a predetermined level, the emitter 68 and the collector 70 will experience an electrostatic discharge event, i.e., a spark between the emitter 68 and the collector 70, wherein electrons are transferred therebetween and the charge imbalance is reduced. As will be set forth in greater detail below, the electrostatic discharge event can be detected and, by employing time-of-flight analysis, the position along the length of the discharge apparatus 44 can be determined. From this, the power generation rate at the position can be determined, as will be set forth in greater detail below.

As can be understood from FIG. 2, the collector 70 is elongated and has a pair of ends 72A and 72B, and the discharge apparatus 44 further includes a pair of connectors 74A and 74B that are situated on the ends 72A and 72B, respectively. The exemplary connectors 74A and 74B are coaxial type connectors such as coaxial bayonet connectors or other appropriate types of connectors. Coaxial connectors are contemplated for use in the instant application since the emitters 68 are positioned within the interior region of the tube 76 and are situated in a coaxial fashion with the tube of the collector 70, but it is understood that other types of connectors can be employed as the connectors 74A and 74B without departing from the disclosed and claimed concept.

As can be understood from FIGS. 2 and 3, the insulator apparatus 78 is situated within the interior region 76 and electrically insulates the emitters 68 from one another and further electrically insulates each of the emitters 68 from the collector 70. In this regard, it is noted that the emitters 68 are electrically insulated from the collector 70 by virtue of the fact that the insulator apparatus 78 is interposed between the emitters 68 and the collector 70 and because no designated electrically conductive structure such as a wire or other conductor exists to electrically connect together the collector 70 with any of the emitters 68. The emitter apparatus 66 and the collector 70 thus can be said to be electrically insulated from one another. Moreover, the emitter apparatus 66 and the collector 70 can be said to be electrically insulated from one another despite the fact that electrostatic discharge events can occur therebetween across the insulator apparatus 78 when the difference in charge reaches a sufficient level that it overcomes the dielectric properties of the insulator apparatus 78. It thus is understood that the emitter apparatus 68 and the collector 70 are electrically isolated and insulated from one another by the insulator apparatus 78, and it is only when a charge differential exceeds the dielectric properties of the insulator apparatus 78 that a charge-balancing electrostatic discharge event can occur, and it is noted that the occurrence of such electrostatic discharge events does not negate the fact that the emitter apparatus 66 and the collector 70 are electrically insulated from one another. The occurrence of electrostatic discharge events between the emitter apparatus 68 and the collector 70 does not mean that the two are not electrically insulated from one another, and rather it is because the emitter apparatus 68 and the collector 70 are electrically insulated from one another that the charge imbalance that occurs therebetween occasions the electrostatic discharge events therebetween.

FIG. 2 depicts the emitter apparatus 66 with the emitters 68 being distributed along the length of the collector 70 at a fixed spacing as is indicated in FIG. 3 at the numeral 79. FIG. 2 also depicts the emitters 68 as each being of the same fixed length, as at the numeral 75 in FIG. 3. It is understood, however, that in other embodiments the particular lengths and spacing of the various emitters may be fixed and/or may vary for any of a variety of reasons. Advantageously, the particular positioning of the various emitters 68 is stored in the storage 58 for use in determining a particular emitter 68 that has undergone an electrostatic discharge event. It thus can be seen that the positioning and spacing of the various emitters potentially can be optimized or refined based upon particular areas of interest, particular known regions of high energy production, or for any of a variety of reasons that such optimization might be appropriate.

FIG. 2 depicts purely for purposes of illustration the discharge apparatus 44 being disconnected from the connecting wires 48A and 48B. In operation, the connecting wires 48A and 48B are electrically connected with the connectors 47A and 48B and are likewise electrically connected with the inputs 50A and 50B such that instances of detectable occurrences in the discharge apparatus 44 are electrically communicated to the detection device 46.

More specifically, FIG. 2 illustrates in a schematic fashion an electrostatic discharge even 80 in the form of a spark forming between a particular emitter 68A of the plurality of emitters 68 and the collector 70 within the interior region 76. The collector 70 functions in the form of a wave guide to communicate the electromagnetic result of the electrostatic discharge event 80 toward the two ends 72A and 72B.

The connector 74A can be said to have a conductor 81A that is situated adjacent or that extends into the interior 76 of the collector 70 and further includes another conductor 82A that is electrically connected with the collector 70. The conductors 81A and 82A are in the exemplary form of a coaxial bayonet connector, as noted above, which is electrically connectable with a cooperative bayonet connector at the end of the connecting wire 48A for connection of the two conductors 81A and 82A with the inputs 50A. Likewise, the connector 74B has a conductor 81B that is situated adjacent or that extends into the interior 76 of the collector 70 and another conductor 82B that is electrically connected with the collector 70, with both conductors 81B and 82B being in the exemplary form of a coaxial bayonet collector that is connectable with a cooperative bayonet connector at the end of the connecting wire 48B for connection of the conductors 81B and 82B with the input 50B. In this regard, while the conductors 82A and 82B are both depicted as being electrically connected with the collector 70, it is understood that this need not necessarily be the case in all circumstances, and situations are envisioned wherein the electrostatic discharge event can be detected in the absence of such an electrically conductive connection between the conductors 82A and 82B with the collector 70.

The electrostatic discharge event 80 is indicated in FIG. 2 as occurring at a particular position P that is indicated at the numeral 82 as being a position along the length of the collector 70. As mentioned above, the collector 70 functions in the form of a wave guide that communicates the electromagnetic results of the electrostatic discharge event 80 toward the ends 72A and 72B of the collector 70, and it is understood that a voltage is induced in the conductors 81A and 81B when such electromagnetic energy reaches the ends 72A and 72B of the collector 70. Since such electromagnetic energy travels at the speed of light, which is a fixed velocity, the electromagnetic energy resulting from the electrostatic discharge event 80 will reach the ends 72A and 72B at times that depend upon the distance from the ends 72A and 72B where the electrostatic discharge event 80 occurred. Such electromagnetic energy will reach the ends 72A and 72B at different times unless the electrostatic discharge event 80 has occurred precisely at the middle of the collector 70. In the example depicted in FIG. 2, the position P 82 where the electrostatic discharge event 80 has occurred is offset from the center of the collector 70, thereby occasioning a time delay between the signals detected at the ends 72A and 72B.

More specifically, it can be seen that the position P 82 is relatively closer end 72A than it is to the end 72B. Since the electromagnetic energy from the electrostatic discharge event 80 travels at the speed of light in both directions from the position P 82 toward ends 72A and 72B, the electromagnetic energy will be detected at the end 72A prior to its detection at the end 72B in the depicted exemplary electrostatic discharge event 80. Based upon the time lag between the detection at one of the ends 72A and 72B and the detection at the other of the two ends 72A and 72B, the difference in the time of flight from the position P 82 to the two ends 72A and 72B can be relied upon to determine the location of the position P 82 along the length of the collector 70.

Advantageously, therefore, the detection device 46 accurately detects the signals communicated by the connecting wires 48A and 48B to the inputs 50A and 50B and determines from the time lag ΔT the difference between the distance B, which is indicated numeral 88, and which represents the distance between the end 72A of the collector 70 and the position P 82, and the distance D, which represented by the numeral 90, and which is the distance between the opposite end 72B of the collector 70 and the position P. In this regard, it is noted that the length A, indicated at the numeral 86, and which represents the length of the connecting wire 48A, and the length E, which is indicated at the numeral 92, and which represents the length of the connecting wire 48B, may or may not be equal. Regardless of whether the distances A and B 86 and 92 are equal, the positional difference between the distances B and D 88 and 90 can be derived from the following equation:

$$\Delta T = \frac{A+B}{V} - \frac{D+E}{V}$$

It is reiterated that A and E 86 and 92 are known. One can derive from the previous equation the following equation:

$$D = B = \Delta TV + A - E$$

Employing the known values for A and E 86 and 92, the speed of light (which is V), and the ΔT that was detected by the detection device 46 as being the time lag between the detection of the two signals at the inputs 50A and 50B, the value of D−B can readily be determined. If D−B equals 0, the position P 82 is precisely at the center of the collector 70 at equal distances between the ends 72A and 72B. Depending upon whether D−B is positive or negative and its value, the precise position of the occurrence of the electrostatic discharge event 80 can be determined, it being reiterated that the exemplary electrostatic discharge event 80 is depicted in FIG. 2 as occurring at the position P 82.

Once the location of the position P 82 has been determined, the routines 60 then employ a lookup feature to determine, based upon a mapping of the emitters 68 along the collector 70, which of the emitters 68 experience the electrostatic discharge event 80. In the depicted exemplary embodiment, the specific emitter 68A experienced the electrostatic discharge event 80. The routines 60 thus will store in the storage 58 a record representative of the fact that emitter 68A has undergone an electrostatic discharge event and, perhaps, the time of such occurrence.

In this regard, it is noted that an electrostatic discharge event can occur between the particular emitter 68A and the collector 70 at any of a plurality of positions along the collector 70 that are proximate between the particular emitter 68A and the collector 70. That is, if the particular emitter 68A is, for example, three inches in length, various electrostatic discharge events could occur between the particular emitter 68A and the collector 70 at any of a plurality of positions along an approximately three inch long portion of the collector 70. It thus is desirable to store in the storage or at least be able to obtain from the stored data the fact that the electrostatic discharge event occurred with respect to the emitter 68A rather than merely noting the particular position P 82, and this is because the bombardment of the emitter 68 as a whole is what generates the difference in charge between it and the collector 70. In some instances, a given emitter 68 might be slightly malformed such that all of the electrostatic discharge events that occur on that given emitter 68 occur at one end thereof, by way of example. In such a circumstance, the repeated occurrences of sparks at that end do not represent a high power flux at that precise location, i.e., at the end of the given emitter 68, and rather merely represent that the electrostatic discharge events that were experience by the given emitter 68 have taken place at such location. The occurrences of each electrostatic discharge events on that given emitter 68 indicate that the given emitter 68 as a whole has undergone neutron bombardment. As such, the neutron flux that is determined to have resulted from such electrostatic discharge events occurring at any location on such an emitter 68 would be interpreted as being a part of a power generation value calculated as being situated at the center of such emitter 68. Such a methodology avoids the existence of various formation failures and other issues from erroneously indicating that an accidental concentration of electrostatic discharge events at a particular position along a specific emitter 68 is representative of a concentrated neutron flux at the particular position along the length of the collector 70. Stated otherwise, if one relies solely on the positions of the electrostatic discharge events 80 without relating them back to the specific emitters 68 that underwent such electrostatic discharge events 80, such reliance upon the positions of the sparks could result in data that is less than wholly representative of the neutron flux along the length of each emitter.

In this regard, the center of the emitter 68A is designated as being the location L, which is indicated at the numeral 94, and which is situated along the length of the collector 70 and positioned at the longitudinal center of the emitter 68A. The neutron flux experienced by the emitter 68A is thus stored as having its effective location at the location L along the length of the collector 70.

The detection assembly 42 could thus be said to operate in the following fashion. First, it would be necessary to connect the discharge apparatus 44 with the inputs 50A and 50B on the detection device 46 by connecting the wires 48A and 48B with the connectors 74A and 74B and with the inputs 50A and 50B. Upon an occurrence of an electrostatic discharge event, the detection device 46 would detect at the inputs 50A and 50B an input signal that is representative of the occurrence of the electrostatic discharge event 80. In this regard, the input signal would likely be in the nature of two electrical signals that are received at the inputs 50A and 50B at different times (or perhaps at the same time). That is, input signal would be comprised of a pair of separate signals that are received at the separate inputs 50A and 50B. The detection device 46 would then determine from the input signal received at the two inputs 50A and 50B a time differential between the portion of the input signal that is received at the input 50A and the portion of the input signal that is received at the input 50B.

The detection device 46 would then employ the time differential to identify a position P 82 along the length of the collector 70 as being the site where the electrostatic discharge event 80 occurred. It would then be possible to determine a neutron flux and thus a rate of power generation at a location 94 that is representative of the particular emitter 68A that includes the position P 82 and that is based at least in part upon the occurrence of the electrostatic discharge event 80. In so doing, it may be desirable to employ the position P 82 to identify the particular emitter 68A, for example, that experienced the electrostatic discharge event 80 and to store in the storage 58 a record that is representative of the occurrence of the electrostatic discharge event 80 having occurred at the particular emitter 68A.

As mentioned above, the discharge apparatus 44 relies upon electromagnetic energy being received at the connectors 74A and 74B, and, more particularly, at the conductors 81A and 81B to detect the electromagnetic evidence that is indicative of the occurrence of the electrostatic discharge event 80 at the position P 82. It is noted, that in other embodiments, such as those set forth in greater detail, it may be appropriate and desirable to additionally or alternatively detect the occurrence of the electrostatic discharge event by detecting acoustic evidence of the electrostatic discharge event 80.

For example, an improved discharge apparatus 144 in accordance with a second embodiment of the disclosed and claimed concept is depicted in FIG. 5 and is usable in conjunction with the detection device 46 and the connecting wires 48A and 48B to form an improved detection assembly in accordance with another embodiment of the disclosed and claimed concept. The discharge apparatus 144 includes an emitter apparatus 166 having a plurality of emitters 168 that are essentially the same as the emitter apparatus 66 and the plurality of emitters 68. The discharge apparatus 144 further includes a collector 170 that is essentially the same as the collector 70 and that includes a pair of opposite ends 172A and 172B. Likewise, an insulator apparatus 178 is provided to electrically insulate the emitters 168 from one another and from the collector 170.

It is noted, however, that the discharge apparatus 144 advantageously includes a pair of acoustic energy detectors which are depicted herein in the exemplary form of a pair of microphones 196A and 196B that are situated at the ends 172A and 172B, respectively. The microphone 196A has a pair of leads that are connected with a pair of conductors of a connector 174A, and the microphone 196B has a pair of leads that are electrically connected with the conductors of another connector 174B.

When the microphones 196A and 196B detect the acoustic "snap" or other acoustic evidence of the electrostatic discharge event 80, which is not expressly depicted in FIG. 5, the resultant electronic signals are received at the inputs 50A and 50B. These electronic signals that are received at the inputs 50A and 50B make up the input signal, and the time difference in their arrival at the inputs 50A and 50B is employed to determine from the foregoing equations the position along the length of the collector 170 where the electrostatic discharge event occurred. An equation would be employed that would incorporate both a first velocity of acoustic energy within the collector 70 (such as through the insulator apparatus 178 and the emitter apparatus 166) and a second, different velocity of the electronic signals along the connecting wires 48A and 48B themselves. It is noted that the acoustic signals would travel at a given velocity whereas the signals communicated along the connecting wires 48A and 48B would be communicated at the much faster speed of light. The velocity of the acoustic energy within the collector 70 desirably would be measured prior to deployment of the discharge apparatus 144, although it is possible that this velocity could be derived using principles that would be known to those of ordinary skill in the relevant art. Regardless of the fashion in which the velocity of acoustic energy within the collector 170 is determined, it should be apparent that the time of flight of the acoustic energy that results from the electrostatic discharge event and its time-differential detection at the microphones 196A and 196B can be employed as an input to determine the specific position where the electrostatic discharge event occurred. This position can then be employed to determine neutron flux and thus power generation at numerous locations along the length of the collector 170.

Depending upon the needs of the particular application, it may be desirable to derive either via experimentation or otherwise velocity curves that represent velocities of sound in the collector 170 according to temperatures, pressures, and the like, as appropriate, which potentially can vary within the interior of the nuclear reactor 4. It may be necessary to make allowances for both the transmission of acoustic energy through the insulator apparatus 178 as well as through the emitters 168. Depending upon the needs of the particular application, however, it may be desirable to provide a more-or-less unobstructed path for the transmission of acoustic energy to the acoustic energy detectors.

Accordingly, an improved discharge apparatus 244 in accordance with a third embodiment of the disclosed and claimed concept is depicted in FIG. 6 and can be employed with the detection device 46 and the connecting wires 48A and 48B to provide an improved detection assembly in accordance with another embodiment of the disclosed and claimed concept. The discharge apparatus 244 is similar to the discharge apparatus 144, except that the discharge apparatus 244 and, more particular, an emitter apparatus 266 thereof, includes not only a plurality of emitters 268 but additionally includes a communication tube 284. The communication tube 284 is situated alongside a collector 270 and has a pair of ends 298A and 298B. The discharge apparatus 244 further include a pair of acoustic energy detectors in the form of a pair of microphones 296A and 296B that are situated at the ends 298A and 298B of the communication tube 284 and that are electrically connected with a pair of connectors 274A and 274B. While the discharge apparatus 244 includes an insulator apparatus 278 that electrically insulates the emitters 268 from one another and from the collector 270, any sound that may be communicated through the collector 270 is not necessarily detected at its ends, and rather the detection of sound is instead performed at the ends 298A and 298B of the communication tube 284.

The communication tube 284 could communicate acoustic energy in the following fashion, by way of example and without limitation. An electrostatic discharge event 280 might occur at a particular position within the collector 270, and the acoustic energy resultant therefrom would radiate in all directions outwardly from the electrostatic discharge event and be thereby received in the communication tube 284 at a location adjacent the position where the electrostatic discharge event occurred. Such acoustic energy could then be communicated along the communication tube 284 toward its opposite ends 298A and 298B for eventual detection by the microphones 296A and 296B.

The sound may be communicated in the communication tube 284 by the material from which the communication tube 284 is itself formed and/or may be communicated through the interior region of the communication tube 284 if some type of medium 285 such as a gas or other material is received in the interior region of the communication tube 284. Moreover, the communication tube 284 may not be hollow at all and may instead be in the form of a solid rod of material, such as a metallic material or other material, which would serve as the medium through which the acoustic energy is communicated to the ends 298A and 298B for detection by the microphones 296A and 296B at the ends 298A and 298B, respectively. It is possible that the acoustic energy that is communicated along the collector 270 could itself further excite the communication tube 284, but such additional transient and secondary acoustic energy in the communication tube 284 could be filtered or ignored, if desirable. Dependent upon the materials from which each of the collector 270, the communication tube 284, the medium 285, and the insulator apparatus 278 are formed, such filtration or the like may be unnecessary if the primary acoustic energy that is initially excited by the occurrence of the electrostatic discharge event 280 in the communication tube 284 is received at the ends 298A and 298B before any such aforementioned transient or secondary acoustic energy is received. Additional microphones potentially could be provided at the ends of the collectors 270 which could provide signals that could be used in performing such filtration of the transitory and/or secondary signals that potentially may be received in the communication tube 284.

The position of the electrostatic discharge event 280 could be determined using equations similar to those set forth above, except employing a length F indicated generally at the numeral 289 in place of the dimension B and by employing the dimension G indicated at the numeral 291 in place of the dimension D. Also, the new dimensions F and G 289 and 291 would be divided by the velocity of the acoustic energy through the medium 285 whereas the dimensions A and E 86 and 92 would be divided by the speed of light. Such appropriate equations and others can be employed and would easily be within the capability of a person of ordinary skill in the relevant art. The communication tube 284 is depicted herein in an exemplary fashion as being longer than the collector 270 simply for the purpose of illustrating that the communication tube 284 is different from the collector 270.

An improved discharge apparatus 344 in accordance with a fourth. embodiment of the disclosed and claimed concept is depicted in FIG. 7 as including a pair of connectors 374A and 374B situated at a pair of ends 372A and 372B, respectively, and the discharge apparatus 344 is capable of being connected with the detection device 46 and the connecting wires 48A and 48B in order to form another detection assembly that is in accordance with another embodiment of the disclosed and claimed concept. The discharge apparatus 344 includes an emitter apparatus 366 that includes a plurality of emitters 368 in the fashion of the discharge apparatus 44. The discharge apparatus 344 additionally includes a collector 370 that is similar to the collector 70. Furthermore, an insulator apparatus 378 that is employed in the discharge apparatus 344 is similar to the insulator apparatus 78.

As can be seen in FIG. 7, however, the discharge apparatus 344 includes a pair of acoustic energy detectors in the form of microphones 396A and 396B that are configured to detect acoustic energy in the discharge apparatus 344 that is communicated via two separate media. In particular, the two separate media in the depicted exemplary embodiments include the material from which the insulator apparatus 378 is formed and the material from which the collector 370 is formed. In this regard, it can be seen that the microphone 396A is situated at the end 372A and is configured to detect acoustic energy traveling through the insulator apparatus 378, and this may include the traveling of the acoustic energy through the emitter apparatus 366. On the other hand, the microphone 396B is depicted in FIG. 7 as being mounted to the collector 370 and as detecting the acoustic energy that travels through it. In this regard, it is understood that the collector 370 and the insulator apparatus 378 are formed of two different materials that serve as transmission media that transmit therethrough acoustic energy at different velocities. That is, an amount of acoustic energy that is of a first wavelength and amplitude would travel through the collector 370 at a velocity that is different than velocity at which the same acoustic energy at the same wavelength and amplitude would travel through the insulator apparatus 378. The insulator apparatus 378 in the depicted exemplary embodiment is an aluminum oxide material, and it is understood that acoustic energy that travels through the insulator apparatus 378 would also, to a certain extent, travel through and be communicated via the emitters 368 that are embedded within the insulator 378. One of ordinary skill in the relevant art could readily derive the equations that could characterize the travel of acoustic energy through the two materials when combined in the fashion described and depicted herein. The time difference in the signal components received at the inputs 50A and 50B would then be employed with such equations to determine the position where the electrostatic discharge event occurred.

The microphones 396A and 396B are depicted as being mounted at opposite ends of the discharge apparatus 344 for purposes of illustration. It is understood, however, that in alternative embodiments the microphones 396A and 396B could be mounted at the same end of the discharge apparatus 344, with the acoustic energy traveling through the insulator apparatus 378 being detected by the microphone 396A and with the acoustic energy that travels through the collector 370 being detected by the microphone 396B. The particular materials from which the collector 370 and the insulator apparatus 378 are formed is not necessarily particular, but it is noted that the fourth embodiment of the discharge apparatus 344 relies upon the difference in sound transmission velocity between the two media that make up the collector 370 and the insulator apparatus 378 in order to provide the difference in time of flight that enables the discharge apparatus 344 to be usable to determine a position along its longitudinal extent where an electrostatic discharge event has occurred.

An improved discharge apparatus 444 in accordance with a fifth embodiment of the disclosed and claimed concept is depicted generally in FIG. 8 and can be employed in conjunction with the detection device 46 and the connecting wires 48A and 48B to form another improved detection assembly in accordance with another embodiment of the disclosed and claimed concept. The discharge apparatus 444 employs an emitter apparatus 466 having a plurality of emitters 468 and further employs a collector 470, all of which are similar to those of the discharge 44 apparatus. It is noted, however, that the discharge apparatus 444 employs a medium for the transmission of acoustic energy that transmits acoustic energy at different velocities that vary with the wavelength or frequency of the acoustic energy. Nearly every material is capable of communicating acoustic energy at velocities that vary with the wavelength or frequency of the acoustic energy, as is known to those of ordinary skill in the relevant art.

While the collector 470 has a pair of opposite ends 472A and 472B, the discharge apparatus 444 includes only a single microphone 496 having leads that are connected with a single connector 474 that is connectable with one of the inputs 50A and 50B, thereby potentially being of less cost to manufacture, i.e., due to the need for only a single microphone, etc. The discharge apparatus employs an insulator apparatus 478 that may be formed from the same aluminum oxide material from which the other insulator apparatus devices mentioned above are formed, although another insulator apparatus may be employed if it provides preferred acoustic energy transmission at the aforementioned velocity that can vary dependent upon the wavelength or frequency of the acoustic energy. Alternatively, the material from which the collector 470 is formed may be selected based upon its properties of communicating acoustic energy at a velocity that varies with the frequency or wavelength of the acoustic energy. Regardless of the material employed for the transmission medium that communicates the acoustic energy therethrough at varying velocities, the improved discharge apparatus 444 can be provided and implemented at a potentially reduced cost and/or with reduced complexity because of the ability of the individual microphone 496 to detect as a first portion of the input signal a first frequency of acoustic energy and to detect at another time another amount of acoustic energy at a second, different frequency or wavelength, with the difference in reception times, i.e., the time lag, being employed to determine the position where an electrostatic discharge event has occurred. Appropriate equations that rely upon a characterization of the medium and its varying-velocity communication of acoustic energy would be employed in making the determination as to where the electrostatic discharge event occurred. It is noted that the speeds of the various frequencies of sound may themselves vary with the materials used for the transmission of such sounds. Signal attenuation will likely be a function of frequency such that the pulse shape will change as different frequencies are attenuated at different rates.

Refraction effects will result in fewer than all of the waves traveling the same distance. Diffraction effects possibly may eliminate some frequencies from reaching the microphone 496. Furthermore, it is noted that transverse and longitudinal waves may travel at different velocities.

It is expressly noted that the various teachings contained herein can be combined in any of a variety of fashions to achieve improved results. For example, the communication tube 284 may be implemented into the discharge apparatus 444 and it may employ as its medium 285 a specifically selected medium that transmits acoustic energy at different velocities depending upon its frequency and/or wavelength, by way of example. In such a circumstance, the microphone 496 would be mounted to an end of the communication tube 284 rather than being mounted to an end of the collector 470. Other variations would be apparent.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A discharge apparatus usable in a nuclear reactor environment for determining neutron flux at a plurality of locations and being structured to be connected with a number of inputs of a detection device, the discharge apparatus comprising:
    an elongated emitter apparatus comprising a plurality of emitters spaced apart from one another in a predetermined fashion along the longitudinal extent of the emitter apparatus, the plurality of emitters each being structured to emit a number of electrons via beta decay responsive to absorption of neutrons;
    a collector situated in proximity to the emitter apparatus and being structured to collect from the plurality of emitters the number of electrons;
    an insulator apparatus interposed between the emitter apparatus and the collector, the insulator apparatus electrically insulating from one another at least some of the emitters of the plurality of emitters;
    the emitter apparatus and the collector being electrically insulated from one another due at least in part to the insulator apparatus; and
    at least some of the emitters of the plurality of emitters each being structured to undergo an electrostatic discharge event with the collector when an imbalance in electrical charge between the emitter and the collector is sufficient to exceed the dielectric properties of the insulator apparatus.

2. The discharge apparatus of claim 1 wherein the plurality of emitters comprise a plurality of pieces of wire of known length.

3. The discharge apparatus of claim 1 wherein the collector comprises an elongated tube, and wherein the emitter apparatus further comprises a first detector situated at a first end of the tube and a second detector situated at a second end of the tube opposite the first end, the first detector being structured to be electrically connected with a first input of the number of inputs and to generate an output signal responsive to detecting the electrostatic discharge event, the second detector being structured to be electrically connected with a second input of the number of inputs and to generate another output signal responsive to detecting the electrostatic discharge event.

4. The discharge apparatus of claim 3 wherein the first and second detectors are acoustic detectors that are structured to acoustically detect the occurrence of the electrostatic discharge event and to responsively generate electrical signals as the output signal and the another output signal.

5. The discharge apparatus of claim 1 wherein the collector comprises an elongated tube, and wherein the emitter apparatus further comprises another tube, a first detector, and a second detector, the emitter apparatus being situated within an interior region of the tube, the another tube being elongated and being in communication with the tube, the first detector being situated at a first end of the another tube, the second detector being situated one of at the first end and at a second end of the tube opposite the first end, the first detector being structured to be electrically connected with a first input of the number of inputs and to generate an output signal responsive to detecting the electrostatic discharge event, the second detector being structured to be electrically connected with a second input of the number of inputs and to generate another output signal responsive to detecting the electrostatic discharge event.

6. The discharge apparatus of claim 5 wherein the first and second detectors are acoustic detectors that are structured to acoustically detect the occurrence of the electrostatic discharge event via communication of sound from the electrostatic discharge through the another tube and to responsively generate electrical signals as the output signal and the another output signal.

7. The discharge apparatus of claim 1 wherein the collector comprises an elongated tube, and wherein the emitter apparatus further comprises a first detector situated at a first end of the tube and a second detector situated one of at the first end and at a second end of the tube opposite the first end, the first detector being an acoustic detector that is structured to be electrically connected with a first input of the number of inputs, the first detector being structured to acoustically detect through a first medium of the discharge apparatus the occurrence of the electrostatic discharge event and to responsively generate an output signal, the second detector being an acoustic detector that is structured to be electrically connected with a second input of the number of inputs, the second detector being structured to acoustically detect through a second medium of the discharge apparatus the occurrence of the electrostatic discharge event and to responsively generate another output signal, the first medium being a material that transmits a particular acoustic energy therethrough at a first velocity, the second medium being a material that transmits the particular acoustic energy therethrough at a second velocity different than the first velocity.

8. The discharge apparatus of claim 7 wherein the first detector is structured to detect the occurrence of the electrostatic discharge event through the material of the tube as the first medium.

9. The discharge apparatus of claim 8 wherein the second medium is one of a material situated within the tube and a material situated at least in part external to the tube.

10. The discharge apparatus of claim 1 wherein the collector comprises an elongated tube, and wherein the emitter apparatus further comprises a detector situated at an end of the tube, the detector being structured to be electrically connected with an input of the number of inputs, the detector being structured to detect through a medium of the discharge apparatus acoustic energy generated as a result of the occurrence of the electrostatic discharge event and to responsively generate output signals, the medium being a material that transmits the acoustic energy therethrough at a velocity that varies with the frequency of the acoustic energy, the detector being structured to detect at a first time a first acoustic aspect of the electrostatic discharge event and to generate a first output signal, and the detector being structured to detect at a second time different from the first time a second acoustic aspect of the electrostatic discharge event that is of a different frequency than the first acoustic aspect and to generate a second output signal.

11. The discharge apparatus of claim 10 wherein the medium is the material of the tube.

12. A method of employing the discharge apparatus of claim 1 in determining neutron flux at a plurality of locations in a nuclear reactor environment, the method comprising:
   connecting the discharge apparatus with a number of inputs of a detection device;
   detecting an input signal at the number of inputs as being representative of an electrostatic discharge event;
   determining with the detection device a time differential between a portion of the input signal and another portion of the input signal;
   employing the time differential to identify a position along the longitudinal extent of the emitter apparatus as being the site where the electrostatic discharge event occurred; and
   determining a neutron flux at a location that includes the position and that is based at least in part upon the occurrence of the electrostatic discharge event.

13. The method of claim 12, further comprising:
   employing the position to identify a particular emitter of the plurality of emitters that experienced the electrostatic discharge event; and
   storing in a storage a record representative of the occurrence of the electrostatic discharge event experienced at the particular emitter.

14. The method of claim 12, wherein the collector comprises an elongated tube, and wherein the emitter apparatus further comprises a first detector situated at a first end of the tube and a second detector situated at a second end of the tube opposite the first end, and further comprising:
   electrically connecting the first detector with a first input of the number of inputs;
   detecting the electrostatic discharge event with the first detector and responsively generating an output signal;
   receiving the output signal at the first input as the portion of the input signal;
   electrically connecting the second detector with a second input of the number of inputs;
   detecting the electrostatic discharge event with the second detector and responsively generating another output signal; and
   receiving the another output signal at the second input as the another portion of the input signal.

15. The method of claim 14 wherein the first and second detectors are acoustic detectors, and further comprising:
   acoustically detecting the occurrence of electrostatic discharge event and responsively generating electrical signals as the output signal and the another output signal.

16. The method of claim 12 wherein the collector comprises an elongated tube, and wherein the emitter apparatus further comprises another tube, a first detector, and a second detector, the emitter apparatus being situated within an interior region of the tube, the another tube being elongated and being in communication with the tube, the first detector being situated at a first end of the another tube, the second detector being situated one of at the first end and at a second end of the tube opposite the first end, and further comprising:
   electrically connecting the first detector with a first input of the number of inputs;
   generating with the first detector an output signal responsive to detecting the electrostatic discharge event;
   receiving the output signal at the first input as the portion of the input signal;
   electrically connecting the second detector with a second input of the number of inputs;
   generating with the second detector another output signal responsive to detecting the electrostatic discharge event; and
   receiving the another output signal at the second input as the another portion of the input signal.

17. The method of claim 16 wherein the first and second detectors are acoustic detectors, and further comprising acoustically detecting the occurrence of the electrostatic discharge event via communication of sound from the electrostatic discharge through the another tube and responsively generating electrical signals as the output signal and the another output signal.

18. The method of claim 12 wherein the collector comprises an elongated tube, and wherein the emitter apparatus further comprises a first detector situated at a first end of the tube and a second detector situated one of at the first end and at a second end of the tube opposite the first end, the first and second detectors being acoustic detectors, the discharge apparatus comprising a first medium and a second medium, the first medium being a material that transmits a particular acoustic energy therethrough at a first velocity, the second medium being a material that transmits the particular acoustic energy therethrough at a second velocity different than the first velocity, and further comprising:
   electrically connecting the first detector with a first input of the number of inputs;
   acoustically detecting with the first detector through the first medium the occurrence of the electrostatic discharge event and responsively generating an output signal;
   receiving the output signal at the first input as the portion of the input signal;
   electrically connecting the second detector with a second input of the number of inputs;
   acoustically detecting with the second detector through the second medium the occurrence of the electrostatic discharge event and responsively generating another output signal; and
   receiving the another output signal at the second input as the another portion of the input signal.

19. The method of claim 12 wherein the collector comprises an elongated tube, and wherein the emitter apparatus further comprises a detector situated at an end of the tube, the discharge apparatus comprising a medium that is a material that transmits acoustic energy therethrough at a velocity that varies with the frequency of the acoustic energy, and further comprising:
   electrically connecting the detector with an input of the number of inputs;
   detecting through the medium with the detector at a first time a first acoustic aspect of the acoustic energy generated as a result of the occurrence of the electrostatic discharge event and responsively generating a first output signal;

receiving the first output signal at the input as one of the portion of the input signal and the another portion of the input signal;

detecting through the medium with the detector at a second time different from the first time a second acoustic aspect of the acoustic energy generated as a result of the occurrence of the electrostatic discharge event that is of a different frequency than the first acoustic aspect and responsively generating a second output signal; and receiving the second output signal at the input as the other of the portion of the input signal and the another portion of the input signal.

20. A detection assembly comprising the discharge apparatus of claim 1, the detection assembly being usable in a nuclear reactor environment for determining neutron flux at a plurality of locations, and further comprising a detection device having a number of inputs, the discharge apparatus being electrically connected with the number of inputs.

* * * * *